United States Patent
Butler et al.

(10) Patent No.: US 6,288,866 B1
(45) Date of Patent: Sep. 11, 2001

(54) DISK DRIVE INCLUDING A VIBRATION DAMPING SYSTEM HAVING A COMPRESSIBLE FOAM AND MASS DAMPER FIXED ADJACENT TO THE OUTER SURFACE OF A PRINTED CIRCUIT BOARD FOR REDUCING NOISE AND VIBRATION

(75) Inventors: Walter W. Butler, Felton; Chunjer C. Cheng, Saratoga, both of CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 0 days.

(21) Appl. No.: 09/444,016

(22) Filed: Nov. 19, 1999

(51) Int. Cl.⁷ .................................................. G11B 33/08
(52) U.S. Cl. ........................................................ 360/97.01
(58) Field of Search ............................. 360/97.01, 97.04, 360/97.02, 97.03; 369/263

(56) References Cited

U.S. PATENT DOCUMENTS

| 5,060,100 | * | 10/1991 | Mihara et al. ....................... 360/106 |
| 5,282,099 | * | 1/1994 | Kawagoe et al. ................. 360/97.01 |
| 5,282,100 | * | 1/1994 | Tacklind et al. .................. 360/97.02 |
| 5,394,306 | * | 2/1995 | Koenck et al. ....................... 361/809 |
| 5,596,483 | * | 1/1997 | Wyler ................................... 361/683 |
| 5,757,580 |   | 5/1998 | Andress et al. . |
| 5,982,580 | * | 11/1999 | Woldemar et al. ............... 360/97.02 |

FOREIGN PATENT DOCUMENTS

406126872-A * 5/1994 (JP) .

* cited by examiner

Primary Examiner—David L. Ometz
Assistant Examiner—Franklin D. Altman, III
(74) Attorney, Agent, or Firm—W Chris Kim; Milad G Shara

(57) ABSTRACT

A disk drive including a head disk assembly, a planar printed circuit board and a vibration damping system. The vibration damping system is fixed adjacent the outer surface of the printed circuit board and includes an external planar member of compressible foam composition and a substantially-planar rigid mass damper of like shape and extent and arranged so that the external planar member contacts both the outer surface of the printed circuit board and the upper major surface of the mass damper. The major surfaces of the mass damper include upwardly-convex bosses for receiving fastening screws to maintain a predetermined separation distance between the printed circuit board and the mass damper that is somewhat less than the unconstrained thickness of the external planar member of compressible foam composition.

14 Claims, 4 Drawing Sheets

DISK DRIVE INCLUDING A VIBRATION DAMPING SYSTEM HAVING A COMPRESSIBLE FOAM AND MASS DAMPER FIXED ADJACENT TO THE OUTER SURFACE OF A PRINTED CIRCUIT BOARD FOR REDUCING NOISE AND VIBRATION

BACKGROUND OF THE INVENTION

1. Field of the Invention

The present invention relates to disk drives. More particularly, this invention pertains to a disk drive that includes a vibration damping system having a compressible foam and mass damper fixed adjacent to the outer surface of a printed circuit board for reducing noise and vibration.

2. Description of the Prior Art

Disk drives are commonly employed in workstations, personal computers, portables and other computer systems to store large amounts of data in a readily-available form. Typically, the primary components of a hard disk drive are a head disk assembly and a printed circuit board assembly. When fixed to one another, they form a functional unit for insertion into a bay of a host computer.

The head disk assembly includes a base casting and a cover, a disk having a recording surface, a spindle motor for causing the disk to rotate and an actuator arrangement, driven by a voice coil motor, for advancing a read/write head. A flex circuit transmits data signals to and from the read/write head of the actuator.

The printed circuit board assembly includes circuitry for processing signals and controlling operations of the drive. A representative disk drive incorporating the structures referred to herein is taught, for example, in U.S. Pat. No. 5,790,348 of Alfred et al. entitled "Head Stack Assembly Having a Coil Portion for Damping Vibration Which Includes Elongated Openings in the Plastic Portion." Such patent, property of the assignee herein, is hereby incorporated by reference.

The operation of a hard disk drive necessarily generates structural noise and vibration. Both the electromagnetic spindle and the electromechanical voice coil motors drive the device with the spindle motor continually rotating the storage disk(s) and the voice coil motor selectively driving the actuator(s) to position the read/write heads in the "seek" mode. The motors transmit resonances throughout the disk drive, creating structural vibrations and acoustical, audible noise of varying frequencies. Such noise is transmitted to the substantially-planar printed circuit board which, in turn, can amplify resonant frequency sound intensity, acting, in effect, as a speaker diaphragm.

The presence of acoustic noise in an operating disk drive is undesirable. Customers perceive loudness as an indication of lower quality. As such, acoustic characteristics serve as a benchmark of product quality. Increases in spindle motor speeds intensify the noise transmitted by the head disk assembly to the printed circuit board assembly. Acoustics standards, such as those of the internationally-recognized European International Standards Organization ("ISO"), are regularly lowered, forcing manufacturers to design disk drives characterized by reduced acoustic noise.

SUMMARY OF THE INVENTION

The invention can be regarded as a disk drive that includes a head disk assembly having a base casting that comprises a sidewall defining a base area within the peripheral edge of the assembly. A planar printed circuit board includes opposed inner and outer surfaces. The board is fixed within the base area of the assembly so that the inner surface of the printed circuit board faces the assembly.

A vibration damping system for reducing noise and vibration associated with operation of the disk drive is fixed adjacent the lower surface of the board and substantially underlies the base area. The system includes an external planar member of compressible foam composition characterized by an unconstrained thickness d1 having opposed upper and lower surfaces as well as a substantially-planar, rigid mass damper. The mass damper has major upper and lower surfaces.

The external planar member and the mass damper are of like extent and shape and are arranged in an overlapping configuration. The upper surface of the external member contacts the outer surface of the printed circuit board while major upper surface of the mass damper contacts the lower surface of the external member. Means are provided for fixing the upper surface of the mass damper in substantially-uniform spaced relationship from the outer surface of the printed circuit board by a predetermined amount that is less than d1, thereby compressing the external member.

DESCRIPTION OF THE PREFERRED EMBODIMENTS

Figure 1:
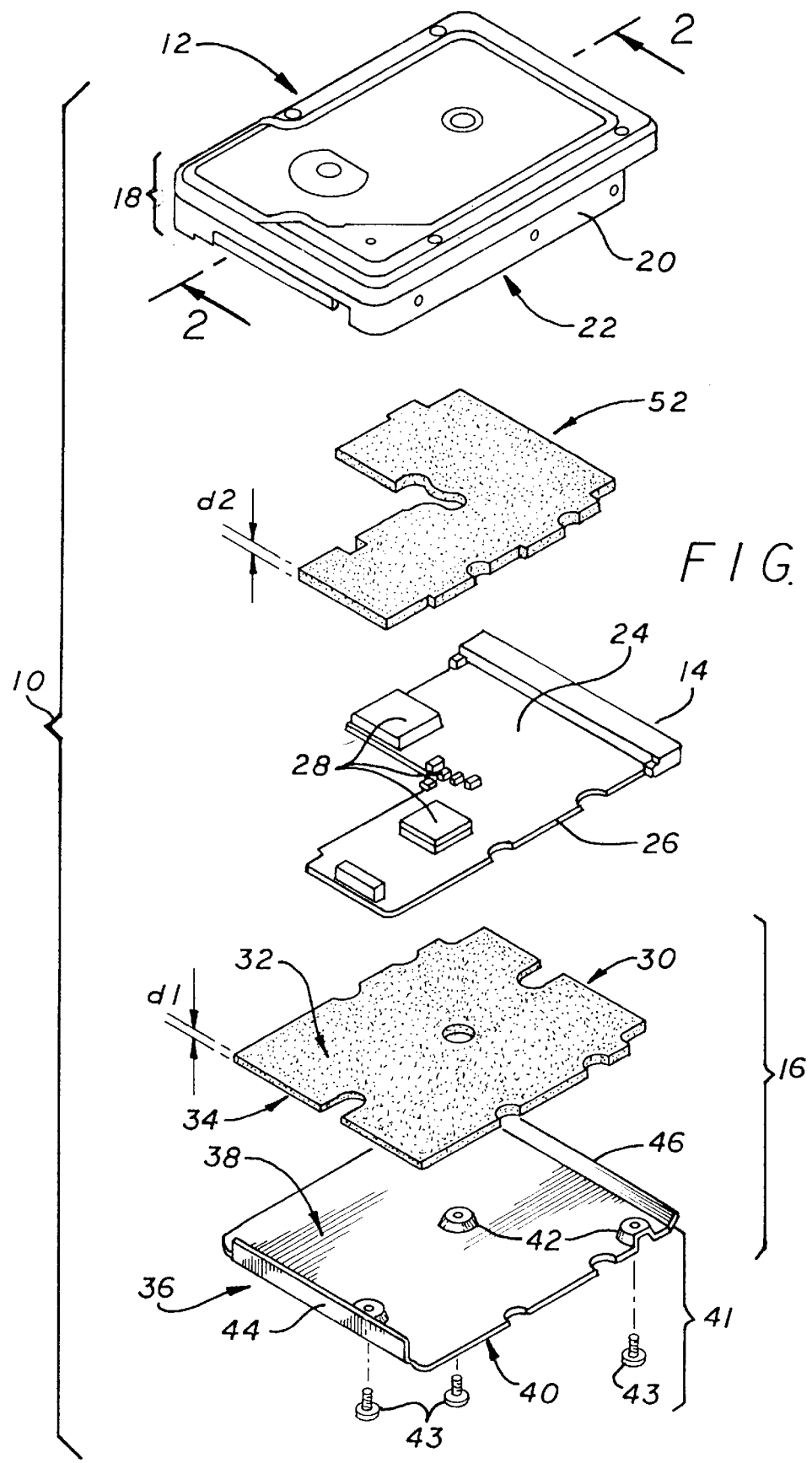
FIG. 1 is an exploded perspective view of a disk drive including a vibration damping system having a compressible foam and mass damper fixed adjacent to the outer surface of a printed circuit board for reducing noise and vibration.

Referring to FIG. 1, a disk drive 10 according to a preferred embodiment of the invention includes a head disk assembly 12, a planar printed circuit board 14 and a vibration damping system 16.

The head disk assembly 12, which, as discussed above, houses numerous functional elements, includes a base casting 18 having a sidewall 20. The sidewall 20 defines a base area 22 within the peripheral edge of the assembly 12. The sidewall 20 preferably comprises four intersecting wall segments giving the disk drive 10 a generally rectangular aspect in the horizontal plane.

Figure 2:
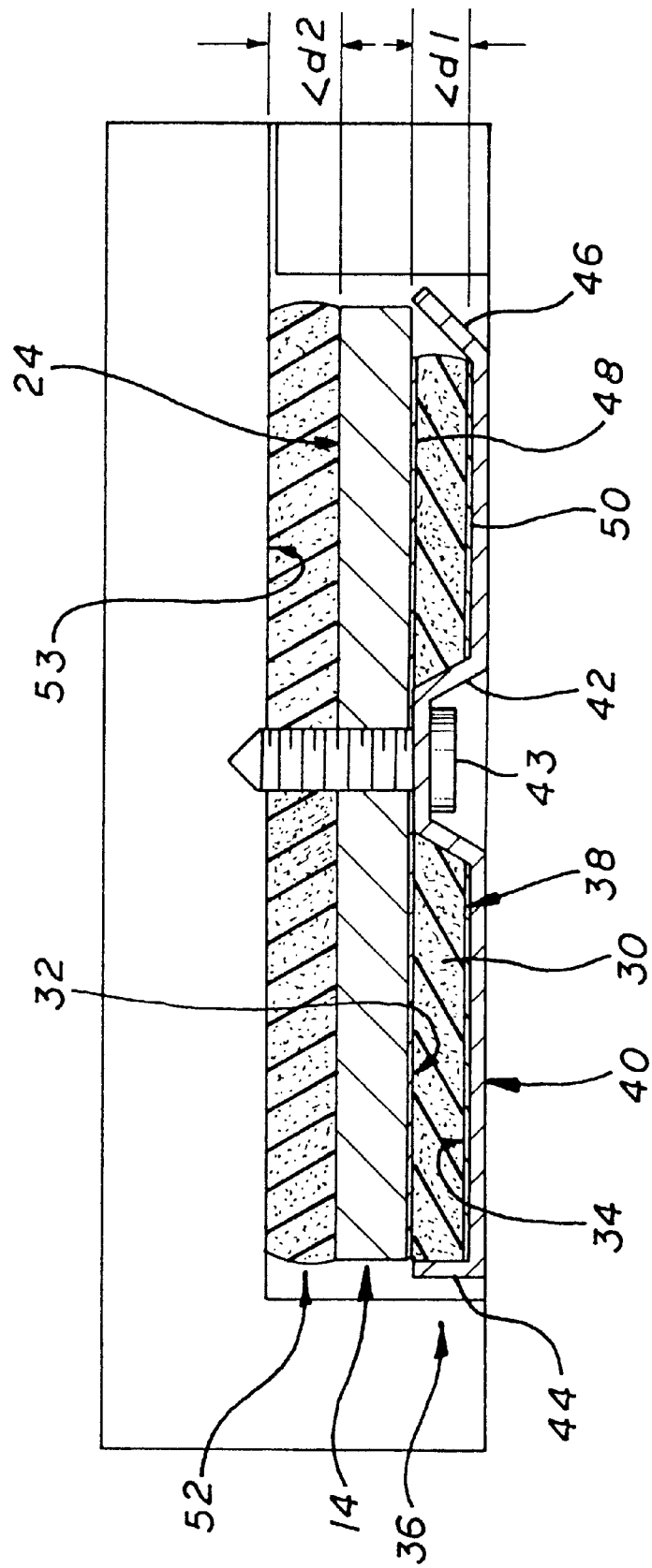
FIG. 2 is a side elevation view in cross-section of an assembled disk drive in accordance with the preceding figure.

The planar printed circuit board 14 includes opposed inner and outer surfaces 24, 26 with circuitry 28 for processing signals and controlling operations of the disk drive fixed to it. As shown in FIG. 2, a cross-sectional view of an assembled disk drive, the board 14 is fixed within the base area 22 with its inner surface 24 facing the assembly 12.

Vibration damping system 16 is fixed adjacent the outer surface 26 of board 14 and substantially underlies the base area 22 to reduce the noise and vibration associated with disk drive operation. It includes an external planar member of compressible foam composition 30 characterized by an unconstrained thickness "d1" and having opposed upper and lower surfaces 32, 34 and a substantially-planar rigid mass damper 36 having upper and lower major surfaces 38, 40. External member 30 is preferably fabricated of a low density open cell foam for absorbing acoustic noise while rigid mass damper 36 is preferably of stainless steel, nickel-plated brass or other dense, corrosion-resistant material to minimize size. By adding mass and stiffness to the disk drive structure, the mass damper 36 acts to reduce the intensity of structural vibration.

External member 30 and mass damper 36 are of like extent, shape and arranged in overlapping configuration whereby the upper surface 32 of external member 30 contacts the lower surface 34 of board 14 and the major upper surface 38 of mass damper 36 contacts the lower surface 34 of external member 30. Matching, aligned apertures and cutouts are provided in the external member 30 and the mass damper 36 for passage of assembly screws.

Disk drive 10 further includes means 41 for fixing the upper surface 38 of the mass damper in substantially-uniform spaced relationship from the outer surface 26 of the printed circuit board 14 by a predetermined amount less than d1 to compress the external member 30. Preferably such means 41 includes a plurality of upwardly-convex bosses 42 formed in the major surface of the mass damper 36 and a plurality of fasteners 43, such as upwardly-directed screws, received within the bosses 42. By compressing the external planar member 30 as shown in FIG. 2, a cross-sectional view of the disk drive taken at line 2—2 of FIG. 1, the vibration damping system 16 exerts a force against the outer surface 26 of the printed circuit board 14 for reducing the amplitude of vibration thereof, thereby reducing vibration and acoustic noise. The low density open cell foam of the external planar member 30 acts to absorb generated acoustic noise. The bosses 42 are preferably sized so that the external planar member 30 is compressed to one half of its unconstrained thickness (i.e. (d1)/2).

The mass damper 36 preferably includes upturned portions 44 and 46 arranged along opposed edges of its generally rectangular major surface. (Note: The mass damper 36 needn't be of rectangular shape. Rather, it is preferably shaped to assure coverage of the printed circuit board 14. It could, for example, be L-shaped to match the contour of, and thereby still cover, the board 14.)

Lagging upturned portion 44 is substantially perpendicular to the major surfaces of the mass damper 36 while leading upturned portion 46 is inclined by less than ninety degrees therefrom. As can best be seen in FIG. 2, each of the upturned portions 44 and 46 facilitates the (rightward as shown) insertion of the disk drive 10 into a computer bay. The substantially-perpendicular upturned portion 44 protects the user's fingers from the otherwise sharp edge of the mass damper 36 while the upturned leading portion 46 provides a taper to prevent the vibration damping system 16 from catching upon any internal structures of the host computer bay. The leading inclined portion 46 also prevents any dislodging of foam from the vibration damping system 16 that might lead to tangling and snagging with elements of the host computer upon insertion and removal.

Additional means for vibration and acoustic noise reduction may be incorporated into the disk drive 10. Referring to FIG. 2, an optional layer 48 of acoustic film may be fixed to the upper surface 32 of the external planar member 30. The layer 48 increases the contacting surface area between the external member 30 and the printed circuit board 14. Such area is otherwise limited by the preferably low density open cell foam composition of external member 30. The supplementation of the surface contact area increases the vibration damping force exerted by the external member 30 to thereby reduce vibration of the circuit board 14 and consequent generation of acoustic noise. An appropriate material for the layer 48 is the low density acoustic film commercially available from Roush Anatrol of Detroit, Mich. under Part Number 205. Such material includes a single adhesive side for fixation to the upper surface 32 of external member 30.

A layer 50 of visco damping material may be located between the upper major surface 38 of the mass damper 36 and the lower surface 34 of the first planar member 30. The layer 50 is preferably formed of a plastic damping material such as that commercially available from the Minnesota Mining and Manufacturing Corporation of Minneapolis, Minn. under Part Numbers ISD-110, 112 and 130 and includes opposed adhesive surfaces for mutual fixation to the first layer 30 and the mass damper 36.

An internal planar member of compressible foam composition 52 may be located between the upper surface 30 of the printed circuit board 14 and base area 22 of the head disk assembly 12. The internal planar member 52 is preferably of open cell foam having an unconstrained thickness "d2" which is less than the distance separating the top surface 53 of base area 22 from inner surface 24 of printed circuit board 14. The internal planar member 52 exerts a damping force against the upper surface 24 of printed circuit board 14 just as external planar member 30 exerts a similar force against its outer surface 26. In combination, the two planar members 14 and 52 act to damp the vibrations of the printed circuit board 14 that produce undesired acoustic sound. As in the case of the external planar member 30, the thickness of the internal planar member 52 is preferably such that it is compressed to one half of its unrestrained thickness in the assembled disk drive.

Figure 3A:
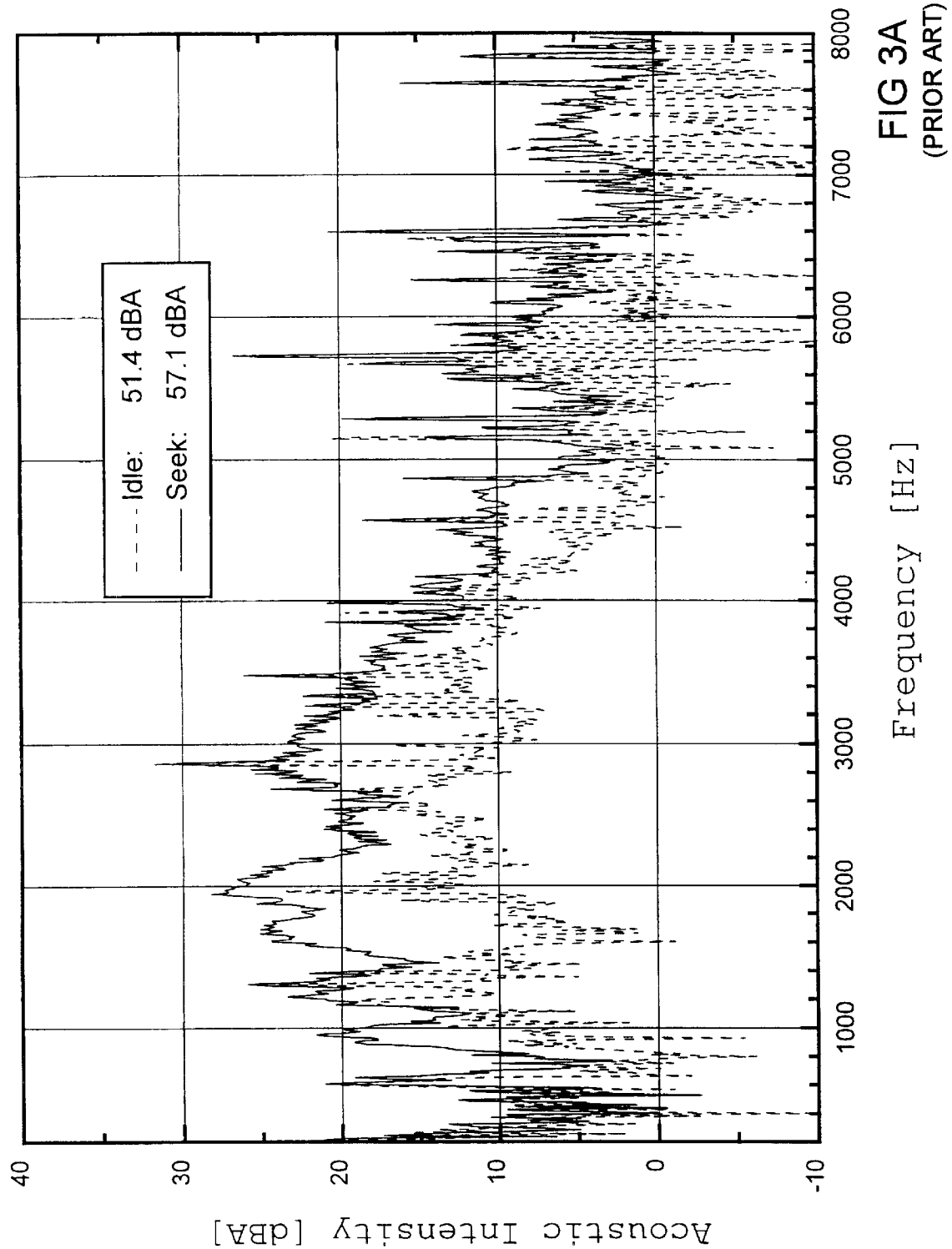
FIGS. 3(a) and 3(b) are graphs of acoustic energy intensity versus frequency for disk drives (at both idle and seek modes) in accordance with the prior art and an embodiment of the invention, respectively.
Figure 3B:
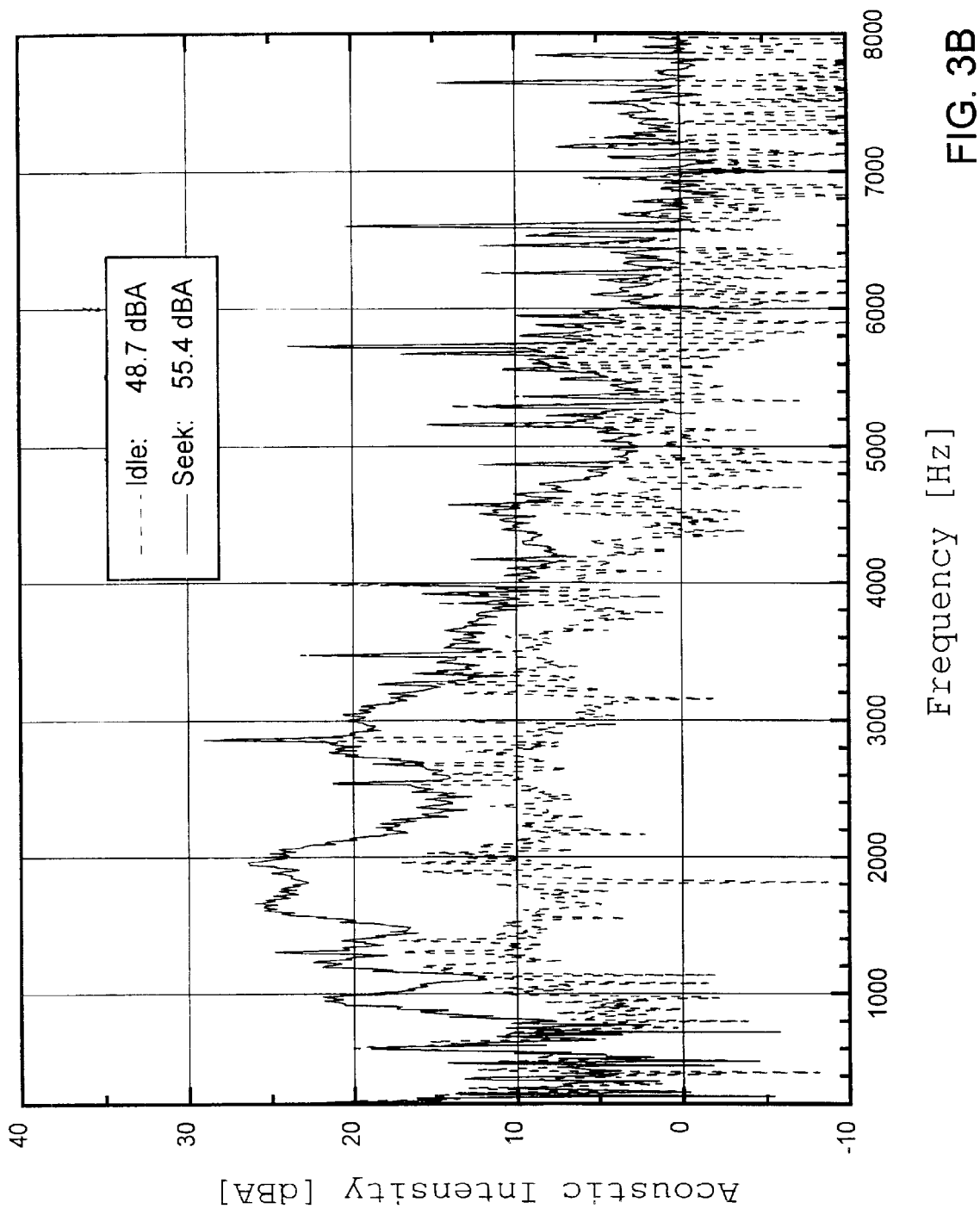

The performance of vibration damping system 16 can be observed by comparison of the graphs of FIGS. 3(a) and 3(b). FIG. 3(a) is a graph of the acoustic intensity (measured in dB Absolute) as a function of frequency for a disk drive in accordance with the prior art. FIG. 3(b) is a graph of acoustic intensity for a disk drive including vibration damping system 16 in accordance with an embodiment of the invention. In comparing the two figures, it can be seen the curves of acoustic noise generated in both the idle (dashed lines, spindle motor generated noise exclusively) and seek (solid lines, spindle motor and voice coil motor generated noise) modes are generally of lower amplitude for a device incorporating the foam/mass damper of the invention. The data illustrated in FIG. 3(a) portrays average acoustic intensity of 51.4 dBA in the idle mode and 57.1 dBA in the seek mode. In contrast, the data of the graph of FIG. 3(b) portrays average acoustic intensity values of 48.7 dBA in the idle mode and 55.4 dBA in the seek mode. Such average values are based upon calculations of perceived (audible) acoustic intensity. Thus, it can be seen that the data indicate reductions in acoustic intensity which reflect reductions in acoustic noise and attendant vibration due to vibration damping system 16 of 2.7 dBA in the idle mode and 1.7 dBA in the seek mode.

We claim:

1. A disk drive comprising, in combination:
   a) a head disk assembly including a base casting comprising a sidewall that defines a base area within the peripheral edge of the assembly;
   b) a planar printed circuit board including opposed inner and outer surfaces, the board being fixed within the base area of the assembly so that the inner surface of the printed circuit board faces the assembly;
   c) a vibration damping system fixed adjacent the lower surface of the board and substantially underlying the base area for reducing noise and vibration associated with operation of the disk drive, the system including:

an external planar member of compressible foam composition characterized by an unconstrained thickness d1 and having opposed upper and lower surfaces; and a substantially-planar rigid mass damper having major upper and lower surfaces;

the external planar member and the mass damper being of similar extent and shape and arranged in overlapping configuration so that the upper surface of the external planar member contacts the outer surface of the printed circuit board and the major upper surface of the mass damper contacts the lower surface of the external planar member; and d) means for fixing the upper surface of the mass damper in substantially-uniform spaced relationship from the outer surface of the printed board by a predetermined amount less than d1 to compress the external planar member.

2. A disk drive as defined in claim 1 wherein the predetermined amount is approximately (d1)/2.

3. A disk drive as defined in claim 1 wherein the means for fixing comprises a plurality of upwardly-convex bosses of predetermined height formed within the major surface of the mass damper.

4. A disk drive as defined in claim 3 wherein the means for fixing includes a plurality of screws, each of the screws being upwardly-directed and received at an upwardly-convex boss to secure the vibration damping system, the planar printed circuit board and the head disk assembly together.

5. A disk drive as defined in claim 1 wherein the external planar member of foam composition comprises low density open cell foam.

6. A disk drive as defined in claim 1 further including:

an internal planar member of compressible foam composition;

the internal planar member contacts the inner surface of the printed circuit board and the top surface of the base area; and the unconstrained thickness of the internal planar member of foam composition is less than the separation distance between the top surface of the base area and the inner surface of the printed circuit board whereby the internal planar member of foam composition is compressed by a predetermined amount.

7. A disk drive as defined in claim 6 wherein the unconstrained thickness of the internal planar member of compressible foam composition and the separation distance between the top surface of the base area and the inner surface of the printed circuit board are such that the internal planar member is compressed to approximately one-half of its unconstrained thickness.

8. A disk drive as defined in claim 7 wherein the internal planar member of foam composition comprises low density open cell foam.

9. A disk drive as defined in claim 1 wherein the mass damper comprises stainless steel.

10. A disk drive as defined in claim 1 wherein the mass damper comprises nickel-plated brass.

11. A disk drive as defined in claim 1 further characterized in that:

the mass damper is generally-rectangular; and at least one edge of the mass damper includes an upturned portion.

12. A disk drive as defined in claim 11 further including:

two opposed edges of the mass damper include upturned portions; and the upturned portion of one of the edges is approximately perpendicular to the major surfaces of the mass damper and the upturned portion of the opposed edge is inclined less than ninety degrees with respect to the major surfaces.

13. A disk drive as defined in claim 1 further including a layer of acoustic film adhered to the upper surface of the external planar member of compressible foam composition in the region of contact with the outer surface of the printed circuit board.

14. A disk drive as defined in claim 1 further including a layer of visco damping film adhered to the upper major surface of the mass damper and to the lower surface of the external planar member of compressible foam composition.

* * * * *